United States Patent [19]

Ward et al.

[11] 3,951,788

[45] Apr. 20, 1976

[54] SLUDGE CONTROL AND DECANT SYSTEM

[75] Inventors: Thomas D. Ward; Marshall W. Ray, both of Weatherford, Tex.

[73] Assignee: Harsco Corporation, Harrisburg, Pa.

[22] Filed: Feb. 10, 1975

[21] Appl. No.: 548,775

Related U.S. Application Data

[63] Continuation of Ser. No. 394,985, Sept. 7, 1973, abandoned.

[52] U.S. Cl. ................................... 210/8; 210/15; 210/138; 210/195 R; 210/202; 210/220
[51] Int. Cl.² ........................................ C02C 1/08
[58] Field of Search ................. 210/8, 14, 15, 138, 210/143, 194, 195, 196, 197, 201, 202, 521, 220

[56] References Cited
UNITED STATES PATENTS

| | | | |
|---|---|---|---|
| 2,285,697 | 6/1942 | Durdin, 3rd | 210/195 X |
| 2,486,691 | 11/1949 | Travers | 210/201 X |
| 3,272,343 | 9/1966 | Caldwell | 210/521 |
| 3,325,014 | 6/1967 | Williamson, Jr. | 210/202 X |
| 3,419,146 | 12/1968 | Koulovatos | 210/138 |
| 3,485,749 | 12/1969 | Reilly | 210/8 X |
| 3,563,382 | 2/1971 | Regent | 210/138 X |
| 3,679,053 | 7/1972 | Koulovatos et al. | 210/138 X |

*Primary Examiner*—Charles N. Hart
*Assistant Examiner*—Robert H. Spitzer
*Attorney, Agent, or Firm*—Cameron, Kerkam, Sutton, Stowell & Stowell

[57] ABSTRACT

A method and apparatus to automatically control the concentration of microorganisms in an activated sludge waste treatment system, consisting of establishing certain factors by laboratory measurements and field observations to determine the quantity of organisms or "sludge" to be removed during a predetermined period of time in order to maintain the proper microbial balance for most efficient operation of the system by the provision of automatic control means to remove a predetermined amount of mixed liquor directly from the aeration tank during such predetermined period of time, allowing the sludge to settle in a settling tank to thicken same, returning the excess water back to the aeration tank, and removing the predetermined amount of concentrated sludge from the settling tank during such predetermined period.

The mechanism employed for practicing the process includes an aeration tank, a settling tank, either incorporated in the aeration tank or separate therefrom, provided with a conical hopper-like bottom, means to supply aerated liquor from the aeration tank to the settling tank, pumps to return supernated liquid from the settling tank to the aeration tank and to remove a predetermined amount of concentrated sludge from the settling tank, and control means for balancing the intake of aerated mixed liquor and the removal of the sludge to maintain the predetermined desirable biological balance in the system.

3 Claims, 5 Drawing Figures

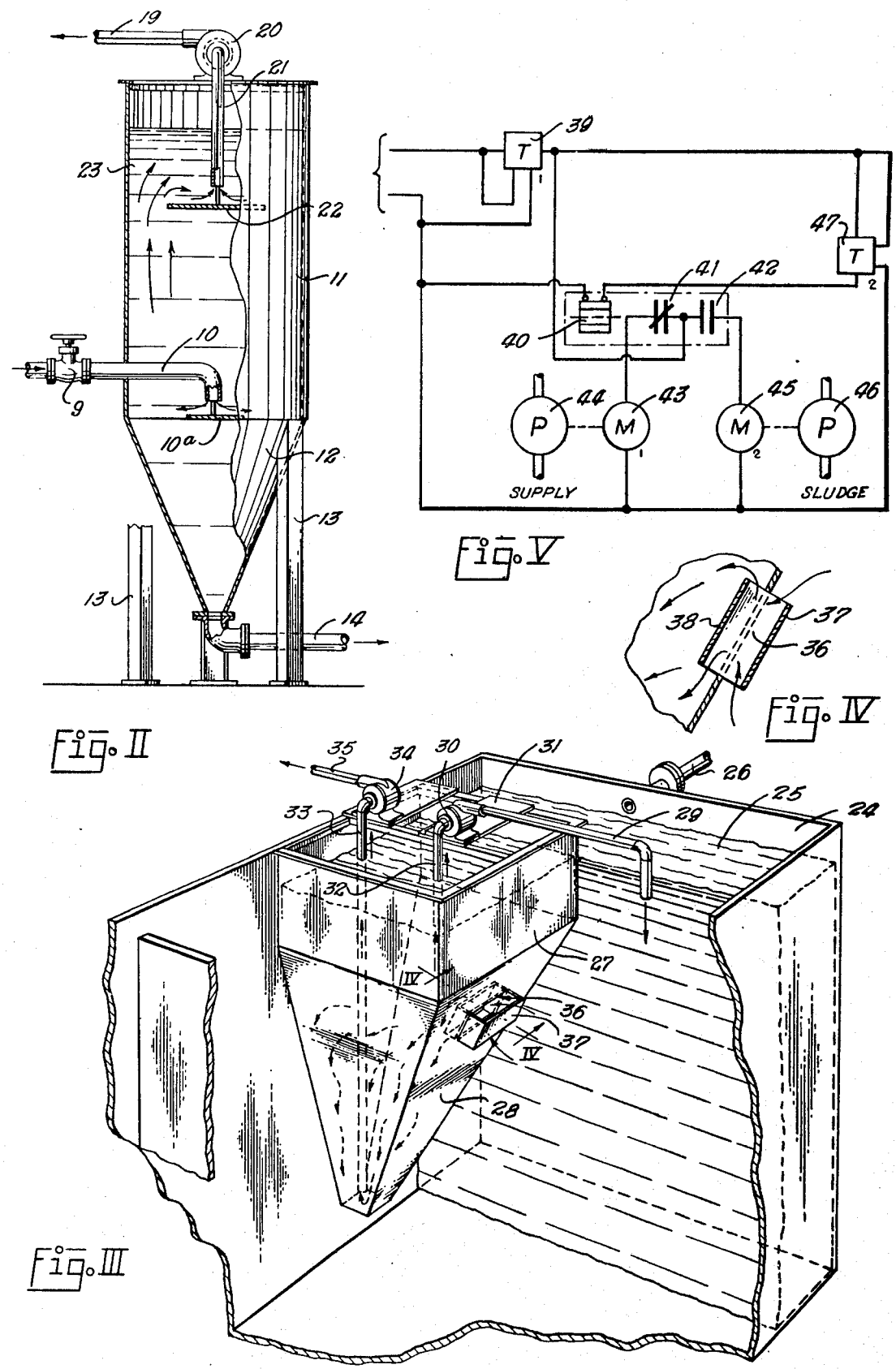

SLUDGE CONTROL AND DECANT SYSTEM

This is a continuation of Ser. No. 394,985, filed Sept. 7, 1973, now abandoned.

BACKGROUND OF THE INVENTION

It is a known fact that optimum waste water treatment with activated sludge systems requires proper microbiology concentrations necessary to consume the liquid and solid organics in the waste water. Since in consuming such organic material the microorganisms reproduce and increase in number it is desirable to separate and discharge excess microorganisms.

Microbiology in the treatment system is in relatively dilute concentrations and it is desirable to concentrate the biological sludge before discharging it to other systems for further destruction. Destruction practices normally employed involve digestion of the sludge, producing a fine particulate matter which if discharged in a stream produces undesirable stream pollution.

Several factors are taken into consideration to determine the quality of treated water leaving a sewage disposal plant. These factors include B.O.D. (Biological Oxygen Demand), T.S.S. (Total Suspended Solids), D.O. (Dissolved Oxygen) and T.O.C. (Total Organic Carbon), which must be balanced with the microorganisms in order to result in the most efficient activated sludge treatment plant to result in the least contamination of streams in which the treated fluid is discharged. This is determined by making measurements on the influent and effluent of the treatment plant at various microorganism concentrations (Mixed liquor concentrations) to determine the concentration which produces optimum removal of all of the undesirable contaminates in the waste water. After such concentration point has been determined efforts must be made to control and maintain the mixed liquor concentration at or near such level.

Biological treatment systems heretofore employed, include activated sludge systems wherein excess microorganisms are removed periodically. However, the solids concentration varies over a broad range causing periods wherein treatment is less than optimum; or systems wherein the nutrients are added but mixed liquor solids are not controlled allowing the system to become overburdened with microorganisms to the extent that the biology of the system is discharged from the plant. The last named system is that typically employed in an extended aeration plant which is characterized by periodic discharges of microogansims from the treatment plant into the effluent receiving stream.

SUMMARY OF THE INVENTION

The system and apparatus which is the subject matter of our invention is intended to overcome the foregoing recited shortcomings of previous systems.

Primarily it consists of a system wherein the growth of microorganisms in sludge is continuously removed in predetermined timed sequence from the system in order to maintain a predetermined concentration of microorganisms therein, so that the microorganism concentration is held at a fixed level, with the total and viable population of microorganisms remaining essentially in the same proportion. It also provides a system for concentrating the biological sludge prior to discharging to a means of disposal.

In carrying out the method microorganisms are concentrated and a predetermined quantity are disposed of each day. In order to accomplish this the rate of sludge growth must be determined. This value may be determined by observing and testing the increase in concentration of microorganisms over a period during which no sludge is removed. By plotting measurements of sludge concentration over a given length of time, the growth rate of microoganisms is determined. By determination of the growth rate of microorganisms it can be determined what percentage of the aeration contents may be wasted each day or for other predetermined period of time.

Based upon this determination equipment is provided to remove a predetermined amount of mixed liquor from the aeration tank during such predetermined period of time, and the sludge is allowed to settle, thereby thickening and separating it from excess water. The excess water is pumped back to the aeration tank and a predetermined amount of sludge is removed from the settling tank in order to maintain the proper balance of microorganisms to waste fluid. In carrying out the process the settling tank is connected in communication with the aeration tank so as to permit gravity flow of the dilute solution from the aeration tank, having microorganisms suspended therein, to the settling tank as excess water or waste sludge is removed from the settling tank. The decant or settling tank may be located within or on the outside of the aeration tank, but in any event the liquid level of the aeration tank and the settling or decant tank will remain identical due to the gravity communication between the two tanks, so that when liquid is withdrawn from either tank or the level of either tank is lowered the liquid will automatically be replenished by virtue of gravity flow.

A pump is provided between the upper portion of the settling tank and the aeration tank, and a pump is provided in communication with the lower portion of the settling tank to discharge concentrated sludge therefrom. The pumps are preferably of equal capacity and timing means is provided to operate the pumps in predetermined timed sequence so as to return the predetermined amount of liquid from the settling tank to the aeration tank, and a predetermined amount of sludge may be removed from the lower portion of the settling tank, depending upon the biological requirements of the system as hereinbefore described.

An important feature of this system is its ability to self-correct. By removing the same volume of mixed liquor each day the system varies the amount of sludge wasted. As the concentration of mixed liquor increases, the number of organisms wasted increases by reason of the higher concentration of mixed liquor being processed. Conversely, if the mixed liquor solids concentration drops the number of organisms wasted decreases. By reason of this balance the system compensates for minor changes in available nutrient, dissolved oxygen, flow and other factors that affect the growth rate of microorganisms.

Thus, the system operates virtually without attention.

Among the objects of the invention are the following:

A sewage treatment system wherein there is provided a positive and automatic means for controlling biological sludge concentration in the treatment system.

A sewage treatment system wherein the biological sludge is preconcentrated prior to discharging it to the digestion or destruction process and it is withdrawn in predetermined amounts in order to maintain the microorganism balance in the system.

A sewage treatment system wherein excess water from the settling tank is returned to the treatment plant before it is contaminated with fine residue from the digestion process.

A sewage treatment system wherein the concentrated sludge results in the reduction of the capacity of the digestor required for sludge processing.

A sewage treatment system wherein the biological balance between waste water admitted to the plant and the microorganisms therein is maintained at a constant level for most efficient treatment of the waste water.

Other and further objects of the invention will become apparent upon reading the detailed specification hereinafter following and by referring to the drawings annexed hereto.

BRIEF DESCRIPTION OF THE DRAWINGS

Suitable embodiments of mechanism for carrying out the invention are shown in the attached drawings, wherein:

FIG. I is a perspective view of the system for carrying out the process;

Figure 1:
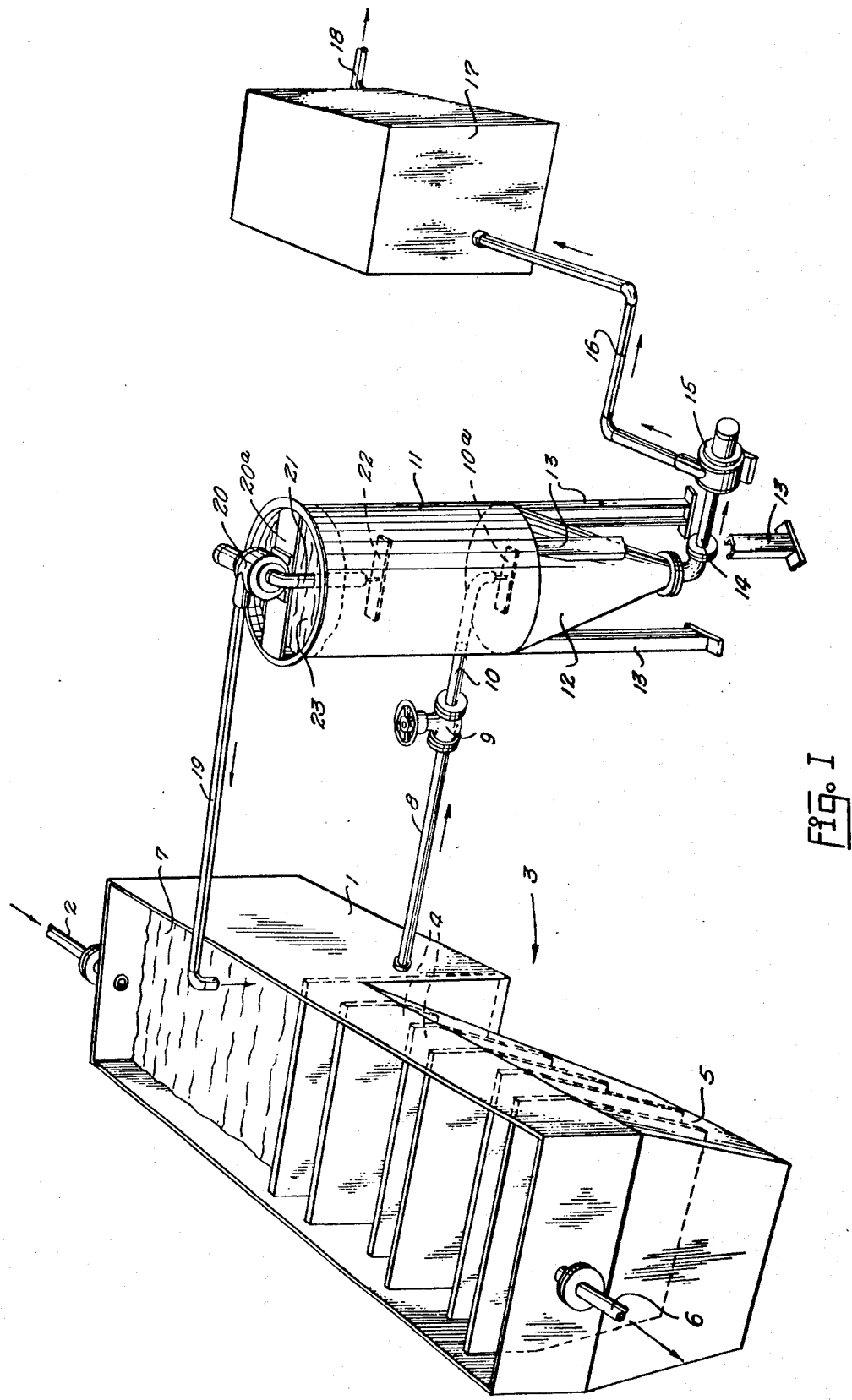

FIG. II is a partially sectionalized side elevational view of the settling tank employed in the system;

FIG. III is a fragmentary sectionalized perspective view of a modified form of mechanism for carrying out the invention, wherein the settling tank is disposed within the aeration tank;

FIG. IV is a sectionalized view showing the passage through the wall of the settling tank shown in FIG. III to provide communication between the aeration tank and the settling tank to maintain a common liquid level in the respective tanks; and FIG. V is a schematic view of the pump and timer circuit for controlling the microbiological balance in the system.

DESCRIPTION OF A PREFERRED EMBODIMENT

A preferred embodiment of mechanism for carrying out the invention is shown in FIGS. I and II, with the control system therefor and for the modified form hereinafter described being shown in FIG. V.

The numeral 1 shows a typical aeration tank into which mixed sewage influent to be treated is admitted through an intake pipe 2. Prior to being admitted to the aeration tank the waste water from the sewage collection system may be left in a settling tank for a sufficient period of time for the larger solids therein to settle out, or it may be discharged in raw state into the aeration tank. In any event the fluid has suspended solids therein.

The clarifier section 3 has vertical baffles or spaced partitions 4 therein. Waste water passes over the upper edges of the partitions, solid matter settles to the bottom from where it is returned to the aeration tank, and clarified water is taken off through discharge line 6, which may be connected to a tertiary filter for further processing, or it may be discharged for disposal. Preferably the lower section 5 of clarifier 3 has sloped walls or mechanical means for concentration of solids therein.

The mixed liquor 7 contains biological solid matter therein which digests the nutrient material therein.

The mixed liquor 7 is withdrawn from the aeration tank 1 through a discharge line 8, the flow through which is controlled by gravity through valve 9, and is discharged into the decant tank 11 through a discharge line 10 against a dispersal baffle 10a mounted in the tank.

The decant tank 11 has a conical shaped bottom 12 into which concentrated sludge settles out and is collected therein so that it may be periodically drawn off through the sludge discharge line 14, communicating with the lower end thereof, by means of a sludge pump 15, which discharges the sludge through a line 16 into a sludge digester 17. The digested sludge may be drawn off from the container 17 through a discharge line 18 and disposed of in the usual manner.

A decant fluid return line 19 is provided to return excess fluid from the decant container 11 to the aeration tank 1.

The pump 20 picks up fluid from the decant tank 11 through an intake line 21 which extends below the surface of the fluid. A baffle 22 is secured to the wall of the tank 11 and extends below the intake line 21 to disperse fluid adjacent the intake line to prevent the formation of eddy currents therein. The pump 20 is arranged to operate at timed intervals to transfer fluid from the decant tank to the aeration tank at timed intervals depending upon the demands of the system and to prevent the discharge of suspended digested particles into a stream or other place where the treated fluid is normally disposed of.

The pump 15 is set to operate at timed intervals, depending upon the requirements of the system, to dispose of excess biological material collected in the bottom of decant tank 11.

The pump 15 discharges the excess biological material into the waste sludge digester where it is digested and reduced to a form for discharge and disposal through the discharge line 18.

The level of the fluid 23 is normally the same level as fluid 7 in aeration tank 1 by reason of gravity feed between the tanks. Fluid is returned from decant tank 11 to the aeration tank 1 at preselected timed intervals in order to maintain the preselected biological balance in the aeration tank 1 as hereinbefore indicated.

MODIFIED FORM

In FIGS. III and IV there is shown a modified form of aeration tank and decant tank wherein the decant tank or sludge concentrater is mounted inside of the aeration tank 24. The waste water sewage influent 25 is deposited into the aeration tank 24 through an intake line 26.

The sludge concentrator tank or compartment 27 is provided with a conical bottom 28 for concentration of the sludge therein.

A pump 30, which corresponds to the pump 20 in the preferred form is mounted on a suitable support 31 attached to the sludge concentrator tank 27. The pump 30 is in communication with the decant line 29 and is arranged to transfer fluid from the decant receptacle 27 to the fluid in the aeration container 24 in order to maintain the biological balance of the fluid in the aeration tank 24 as will be hereinafter described.

Fluid is picked up from the decant tank 27 through the intake line 32.

Sludge is settled from the fluid in decant tank 27 and collects in the bottom of said tank. The discharge line 33 extends to a point near the bottom of the tank 27. The pump 34 communicates with the intake line 33 which extends to a point near the bottom of tank 27 and is arranged to discharge sludge through the discharge line 35. The sludge discharge line 35 communicates with a digester tank, such as shown at 17, where the sludge is digested and disposed of in the usual manner.

The pump 34 is arranged to operate at selected time intervals to withdraw a predetermined amount of sludge from the bottom of the tank 27 to prevent the excess accumulation of same in the decant tank 27 so as to maintain the biological balance in the system as hereinbefore indicated.

An opening 36 is provided through the wall of the decant container 27 which causes fluid communication between the aeration tank 24 and the decant tank 27 so that the fluid level between the tanks 24 and 27 are normally maintained equally by gravity flow.

Baffles 37 and 38 are preferably provided across in spaced relationship on each side of the opening 36 to direct fluid through said opening to prevent the formation of eddy currents.

A master timer 39 is provided for actuation of the decant pump and sludge pump at preselected timed intervals in order to maintain biological balance in the system.

The decant pump 44 is operated by motor 43. The timer 39 is a 24-hour time clock which is preset for the selected period of operation of the unit and to control the respective pumps.

At the selected time the master timer 1 will set into operation the timer 47 which closes magnetic relay 40 which in turn closes the contact 41 therein to set in motion the motor 43 for the decant pump 44 to return fluid from the decant tank to the aeration tank. After a timed interval the timer 47 will open relay contact 41 and will close switch 42, de-actuating motor 43 and pump 44 and actuating motor 45 of sludge pump 46, to withdraw a predetermined amount of sludge from the decant tank. When timer 47 completes a cycle contact 42 is opened de-energizing pump 46 and closes contact 41 restarting pump 44 to repeat the cycle previously described. After a selected time interval master timer 39 will de-energize timer 47 thereby ending the operating cycle of the decant system. Timer 39 will repeat the cycle and thereby maintain the biological balance in the system.

It will be understood that other and further embodiments of the invention may be devised without departing from the spirit and scope of the appended claims.

Having described our invention we claim:

1. A sewage treatment system comprising: an aeration tank including means to aerate waste water; a clarifier tank; means to admit waste water to the aeration tank; a baffle between said aerator tank and said clarifier tank, said baffle having an upper edge over which liquid flows from said aeration tank into said clarifier tank; a decant tank; gravity fluid flow communication means between the aeration tank and the decant tank, said gravity fluid flow communication means having an intake below the elevation of the upper edge of said baffle to prevent flow of floating matter into the decant tank; a first pump; means connecting the first pump to remove clarified liquid from the upper portion of the decant tank and to deliver the clarified liquid to said aeration tank; a sludge digester container; a sludge discharge line connected to the lower portion of the decant tank and connected to the sludge digester container; a second pump in the sludge discharge line to transfer sludge from the decant tank to the sludge digester container; first timer means; means connecting said first timer means to said first pump to actuate the first pump to remove clarified liquid from the decant tank at selected intervals and for selected periods of time; second timer means; and means connecting said second timer means to said second pump to actuate the second pump to discharge sludge from said decant tank at selected intervals and for selected periods of time in order to maintain a predetermined biological balance in the aeration tank.

2. Sewage treatment apparatus comprising: an aeration tank including means to aerate waste water; a clarifier tank; an influent line communicating with said aeration tank; an effluent line communicating with said clarifier tank; means to transfer liquid from said aeration tank to said clarifier tank; a decant tank; means to deliver liquid from the aeration tank to the decant tank, said means to deliver liquid being constructed and arranged to withdraw liquid from said aeration tank without withdrawing material floating on the upper surface of the liquid; a first pump having a suction side and a discharge side; an intake line secured to the suction side of the first pump, said intake line extending into said decant tank; aa decant fluid return line secured to the discharge side of the first pump, said decant fluid return line extending to deposit liquid in said aeration tank; a sludge digester container; a second pump having a suction side and a discharge side; a sludge discharge line, said sludge discharge line having a first end connected to said decant tank and a second end secured to the suction side of the second pump; conduit means connected between the discharge side of the second pump and said sludge digester container; first timer means operably connected to energize said first pump, said first timer means being adapted to maintain said first pump in an energized condition for a predetermined period of time such that a predetermined volume of liquid is circulated from said aeration tank through said decant tank and returned to said aeration tank; and second timer means operably connected to energize said second pump; said second timer means being adapted to energize said second pump for a predetermined period of time at predetermined time intervals to discharge a predetermined volume of sludge from said decant tank to said sludge digester container.

3. A process of maintaining a predetermined concentration of microorganisms in a sewage treatment system comprising the steps of: delivering waste water to an aeration tank; aerating the waste water; determining the growth rate of microorganisms in the aeration tank; siphoning waste water from said aeration tank into a decant tank; generating first electrical signals at predetermined time intervals to energize a first pump to transfer liquid from the decant tank to the aeration tank at a rate such that microorganisms are collected in the decant tank at an average rate approximately equal to the growth rate of microorganisms in the aeration tank; generating second electrical signals at predetermined time intervals and for a predetermined duration to energize a second pump for removing sludge containing microorganisms from the bottom of the decant tank; and depositing the sludge at a location other than in the aeration tank.

* * * * *